Patented Dec. 10, 1940

2,224,804

UNITED STATES PATENT OFFICE 2,224,804

DIGITALIS GLUCOSIDES AND PROCESS FOR PRODUCING THE SAME

Emil Wolf, Budapest, Hungary, assignor to Georg Henning Chem. Pharm. Werk G. m. b. H., Berlin-Tempelhof, Germany, a company of Germany No Drawing. Application February 7, 1938, Serial No. 189,273. In Hungary November 21, 1936

8 Claims. (Cl. 260—210)

My invention relates to the production of digitalis glucosides. These substances are usually obtained by extracting the leaves of digitalis plants and treating the extracts with diluted solutions of a lead salt. In the extraction of the leaves an enzymatic degradation of the glucosides tends to occur. Moreover, the treatment with solutions of lead is expensive and difficult.

It is an object of my invention to produce pure glucosides from the leaves of the digitalis plants.

Another object of the invention is to avoid the difficulties and disadvantages involved in the purification of the extracts by means of lead compositions.

Another object of my invention is to render it possible to extract a high percentage of the glucosides contained in the leaves and to obviate degradation or decomposition of the glucosides.

A further object of my invention is to produce the glucosides in a crystallized form, whereby the products obtained by the first crystallisation are very pure.

Still another object of my invention is to simplify and cheapen the production of glucosides from the respective initial materials.

Further objects and features of my invention will be clear from the following detailed description.

In order to produce the digitalis glucosides I use the leaves of digitalis plants. In general, I prefer the leaves of *Digitalis lanata*, since it is particularly simple to produce crystalline digitalis glucosides from these leaves. Advantageously I use ripe, newly-reaped leaves of this plant which have not been stored for a long time.

According to the invention I treat these leaves of the digitalis plants with an alkaline earth metal oxide which is hard to dissolve or not easily soluble in water and has only a slight basic reaction. I add water only in amount sufficient to form a pulpy mass and extract the mass so obtained by a solvent which is adapted to dissolve the glucosides; then I purify the extract so obtained and separate therefrom the pure glucosides in manner known per se.

Instead of treating the leaves of the plant directly with a metal oxide, I may first treat the leaves with a solvent which is capable of extracting from the leaves the glucoside-containing ingredients, boil down or evaporate the resultant extract, treat the extract with a sparingly soluble alkaline earth metal oxide and then proceed as above stated.

The treatment of the leaves with the sparingly soluble alkaline earth metal oxide is best carried out in a kneading machine, in which the leaves are intimately mixed together with the metal oxide. In this operation the temperature should not exceed a certain limit. Therefore I prefer to add to the mixture some ice which is advantageously in the form of small pieces, although this is not absolutely necessary. The temperature may also be kept down by cooling the mixture or by other suitable means.

As a sparingly soluble alkaline earth metal oxide I use, for instance, magnesium oxide, aluminium oxide, zinc oxide, oxides of the rare earth metals (metals of the alkaline earths) and the like. In general I prefer the use of magnesium oxide since the same is cheap and easily available. In most instances I use the magnesium oxide in the form of a powder, such as known under the trade name "Magnesia usta." It will be understood that any other magnesium oxide, more particularly also a newly precipitated magnesium hydroxide may also be used.

The mass treated with the sparingly soluble metal oxide is advantageously repeatedly extracted with suitable percentages of the solvent, although a continuous extraction may also take place. I prefer to carry out the extraction at a moderate temperature, for instance, at room temperature, so as to avoid any deleterious effect upon the material.

As a solvent for extracting the glucosides I use preferably an oxygen-containing solvent, since the glucosides are best soluble in such solvents. As suitable solvents of this kind I use aliphatic ketones and esters of low boiling point. Acetic ester (acetic acid ethyl ester) is a very suitable solvent for this purpose. Further suitable solvents are acetone, propyl acetate, methyl ethyl ketone or ethyl alcohol. However, I do not confine myself to the use of these solvents, but any solvent may be used within the scope of this invention which is suitable to dissolve the glucosides from the mixture.

Where it is not intended to treat the leaves of the plants directly with the magnesium oxide, the effective glucoside-containing compositions may be first extracted therefrom, as hereinbefore stated. To this end I use preferably solvents which are capable of dissolving the glucoside-containing compositions, such as for instance, the above mentioned aliphatic oxygen-containing agents, such as esters and ketones, more particularly acetic ester or acetone. For extracting from the leaves the glucoside-containing compositions, I use advantageously a large quantity of the solvent, about 10 or 20 times the amount of the leaves to be treated, and I allow the action to take place for a long period of time, for example, 10 to 24 hours. In this operation a moderate temperature is again advisable, room temperature being suitable, although temperatures slightly above or below room temperature may also be used.

In order to facilitate the extraction, the leaves may first be wetted by a solvent containing water, such as, for instance, an alcohol, so as to swell the leaves to some extent before the real extraction.

The glucoside-containing extract obtained by the extraction of the leaves with the oxygen-containing solvent is then evaporated or boiled down and mixed with the sparingly soluble metal oxide and water and extracted in the same manner as hereinbefore described. In many instances it is advisable to continue the evaporation until the extract is absolutely dry, although it is not always necessary for the treatment with the sparingly soluble metal oxide to have an absolutely dry powder.

I contemplate, also, to treat the residue obtained by evaporating or boiling down the extract of the leaves, prior to the treatment with the sparingly soluble metal oxide, with a solvent which is capable of removing the inert admixtures or accompanying substances from the residues. Suitable solvents of this kind are mainly substances which are not miscible or sparingly miscible with water; in most instances I use benzene, toluene, ether, gasoline, or petrol ether, although any solvent may be used within the scope of this invention which is capable of dissolving the inert substances. The residue is advantageously boiled repeatedly, for instance, 2 to 3 times, with this solvent. In many instances boiling is not absolutely necessary, but a treatment at lower temperature is sufficient.

The treatment with a solvent which is adapted to remove the inert admixtures is very advantageous also prior to the real extraction of the glucosides. Therefore, in many instances, I treat the fresh or crude leaves prior to the real extraction with any of the solvents hereinbefore stated for this purpose, such as benzene, gasoline, ether, petrol ether or another solvent adapted to remove the inert admixtures. This treatment is preferably carried out under action of heat or even at the boiling point of the respective liquid, although boiling is not always required. The extraction of the inert accompanying substances is advantageously repeated several times. For instance, it has been found satisfactory to extract the leaves 8 to 10 times. It is advisable to repeat the extracting operation with a solvent until substantially no more inert admixtures are dissolved in the same, as can be easily ascertained by a test.

The said prior treatment by a solvent which dissolves the inert admixtures may take place where the leaves themselves are treated with the sparingly soluble metal oxide as well as where a glucoside-containing extract is produced from the leaves and brought together or mixed with a sparingly soluble metal oxide.

After the treatment with the sparingly soluble metal oxide and the extraction with the oxygen-containing solvent, a crude extract of the digitalis glucosides is obtained which may first be purified by filtration. This extract may be treated in any suitable manner so as to obtain the glucosides contained in it and I do not confine myself to any special method of obtaining the glucosides from this extract. The following methods have been found to be very favourable for this purpose.

The extract of the combined solutions which have been obtained by repeated extracting operation are first evaporated or boiled down, preferably after filtration. The temperature used in the evaporating operations should be as low as possible in order to prevent deleterious effects upon the glucosides. Therefore in many instances I prefer to boil down the solution in vacuum, although a relatively low temperature may be obtained in the evaporating process or boiling operation without reducing the air pressure. The residue thus obtained is then mixed with benzol or ether or another solvent which is not miscible with water and suitable for removing the inert substances or admixtures of the glucosides still contained in the extract. This treatment may be effected at an elevated temperature, for instance, at the boiling temperature of the ether, although lower temperatures may also be applied, if corresponding solvents are used. This treatment may be repeated several times if desired. Advantageously the substance is treated with the solvent which is not miscible with water, until the green mass has been converted into a solid yellow mass. The last residue of this solvent which is not miscible with water may be removed under vacuum.

The dry powder thus obtained is then dissolved in a solvent which is capable of dissolving the glucosides, but does not dissolve the inert admixtures thereof. As a solvent of this kind, for example, diluted alcohol of a concentration of about 50 or 70% strength or acetone, ethyl methyl ketone, an aqueous solution of dioxane and the like may be used. Advantageously I use any oxygenic solvent with certain percentages of water. Generally the glucosides can be produced from this solution in a crystallised condition by slow evaporation of the solvent. The crystallisation can be advanced by inoculating the glucoside with a crystal, as known per se in the art. It is also possible to accelerate the crystallisation by shaking the mass with a solvent which is practically immiscible with the solution and with water and not capable of dissolving the glucosides. For the shaking action I use advantageously ether, benzene, or similar substances. The shaking action may be repeated several times if desired.

Where a very pure product is desired, the crystals obtained by this process may be recrystallised by means of a suitable solvent. For this purpose generally the same solvents may be used which have been hereinbefore mentioned, such as ketones, for instance, acetone or ethyl methyl ketone, alcohols, for instance, ethyl or methyl alcohol, or dioxane, advantageously in the form of a mixture with water.

My novel process and the manner in which it is practically carried out will be better understood by the following examples:

Example 1

Leaves of *Digitalis lanata* which have been dried in the air and finely ground or comminuted are extracted 8 to 10 times by boiling benzene. Then the material is dried at room temperature. 1000 grams of the extracted and dried powder are kneaded for a period of 25 to 50 minutes together with 250 grams of magnesium oxide, gradually adding about 400 to 500 grams of water and a small quantity of finely granulated ice. The mass so obtained is extracted 3 to 4 times with acetic acid ethyl ester at room temperature. The filtered extracts are combined and completely boiled down or evaporated in vacuum at a low temperature. The residue is repeatedly boiled with benzol, until the green mass has been converted into a solid yellow mass. Then the benzol is removed from the material in vacuum and the material is pulverised. The powder thus obtained is dissolved in 30 ccm. of ethyl alcohol of 50% strength and diluted with 70 ccm. water. The solution is inoculated with a crystal of the pure glucoside and allowed to stand, whereby the desired composition will be precipitated or separated in a crystallised condition. The crystallisation can be accelerated by shaking the solution with about the same amount by volume of ether and reseparation of the same. The layer of ether which has been separated from the solution contains substantially only alcohol and inert substances.

The separated crystals are filtered and washed with water. The crystals may be re-crystallised from ethyl-methyl-ketone or a mixture of dioxane and water. The pure product melts, after a gradual softening, at a temperature in the order of 243° C. The specific optical index of rotation of a solution in an ethyl alcohol of 1% strength, at a temperature of 22° C., amounts to +33.4°.

Example 2

1 kg. of newly-reaped finely comminuted leaves of *Digitalis lanata* is wetted with 1 liter of ethyl alcohol of 70% strength and allowed to swell for a period of 12 hours. The mass is then extracted at room temperature with 15 litres of acetic ester and 200 ccm. of water for a period of 14 to 17 hours while stirring. The extracted mass is separated from the acetic ester, squeezed out to remove residual liquid and stirred again for a period of 1 hour with a small quantity of acetic ester. The combined extracts are concentrated at room temperature under vacuum. The residue, after addition of ether, is allowed to swell for some time and again boiled with ether 2 or 3 times. The remaining dry powder is intimately ground with 20 grams of "Magnesia usta" and 10 ccm. of water and this pulp or paste is extracted in two succeeding operations with a total amount of 2 to 3 litres of acetic ether under stirring action. The extracts which have been separated by filtering are commonly boiled down or evaporated and again treated with ether. After removal of the ether the residue is dissolved in 30 ccm. of alcohol of 50% strength and the solution is diluted with water to obtain a quantity of 100 ccm.

The solution thus obtained is repeatedly shaken with 100 ccm. of ether. The crystallisation will then start very soon and will be finished after a period of 2 to 3 days.

For wetting the crude comminuted digitalis leaves, water may be used instead of alcohol. In this case, the mass is not allowed to swell for 12 hours, but is treated further in the manner hereinbefore stated, soon after the wetting action.

Example 3

Finely comminuted leaves of *Digitalis lanata* are extracted 8 to 10 times in succession with boiling benzene. The extracted powder is dried at room temperature and 1 kg. of this powder is wetted with 450 ccm. water and extracted with 15 litres of acetone. The filtered extracts are boiled down and the residue is treated further in the manner stated in Example 2, to obtain the crystallised glucosides.

The powder which has been stirred together with "Magnesia usta" and water to a pulp or paste, may also be extracted with acetone instead of with acetic ester, as stated in Example 2. The further treatment will be the same as stated in Example 2.

While I have herein described certain preferred embodiments of my invention, I wish it to be understood that I do not confine myself to all the precise details herein set forth by way of example, as modification and variation may be made without departing from the spirit of the invention or exceeding the scope of the appended claims.

I claim:

1. A process for producing glucose-containing pure digitalis glucosides comprising the steps of extracting the leaves of *Digitalis lanata* by heating them with a solvent which is immiscible or only slightly miscible with water and adapted to separate inert impurities, freeing the leaves from solvent, mixing the solvent-free leaves with magnesium oxide and ice water, the quantity of the latter being only enough for the production of a pulpy mass, extracting the said mass with a neutral organic solvent for the said glucosides, purifying the resultant extract, and separating the glucose-containing glucosides.

2. A process for producing pure crystallized glucose-containing digitalis glucosides comprising the steps of kneading together leaves of *Digitalis lanata* with magnesium oxide, extracting the mass with a solvent for the said glucosides, evaporating the extract in vacuo at low temperature, treating the residue with a solvent which is immiscible or only slightly miscible with water and adapted to separate inert impurities but which is non-solvent for the glucosides, redissolving the residue in a dilute neutral organic solvent for the said glucosides, and crystallizing the glucose-containing glucosides from the solution.

3. A process for producing glucose-containing pure digitalis glucosides comprising the steps of extracting the leaves of *Digitalis lanata* by heating them with a solvent which is immiscible or only slightly miscible with water and adapted to separate inert impurities, freeing the leaves from solvent, mixing the solvent-free leaves with magnesium oxide and only sufficient water to form a pulpy mass, extracting the said mass with a neutral organic solvent for the said glucosides, evaporating the extract at low temperature, treating the residue with a solvent which is immiscible or only slightly miscible with water and adapted to separate inert impurities, redissolving the residue in a solvent for the glucosides, shaking out this solution with a solvent which is immiscible or only slightly miscible with water and which does not dissolve the glucosides, and crystallizing the glucose-containing glucosides from the solution.

4. A process for producing pure crystallized glucose-containing digitalis glucosides comprising the steps of extracting freshly-reaped leaves of *Digitalis lanata* by heating them with a solvent which is immiscible or only slightly miscible with water and adapted to separate inert impurities, freeing the leaves from the said solvent, extracting the solvent-free leaves with a second solvent capable of dissolving the glucosides from the leaves and water, evaporating the resultant extract, mixing the residue with magnesium oxide, extracting the mixture with a neutral organic solvent for the glucosides purifying the resultant extract, and crystallizing the glucose-containing glucosides from the solution.

5. A process for producing pure crystallized glucose-containing digitalis glucosides comprising the steps of treating leaves of *Digitalis lanata* with a solvent for the glucosides, evaporating the resultant extract, mixing the residue with magnesium oxide, extracting the mass with a solvent for the glucosides, evaporating the extract at low temperature, treating the residue with a solvent which is immiscible or only slightly miscible with water and adapted to separate inert impurities but which is a non-solvent for the glucosides, redissolving the residue in a dilute low-boiling neutral aliphatic solvent for the glucosides, shaking out the solution with a solvent for the inert impurities, separating the glucose-containing glucosides from the solution and recrystallizing the same.

6. A process for producing glucose-containing pure digitalis glucosides comprising the steps of extracting comminuted leaves of *Digitalis lanata* by boiling benzene, drying the resultant extracted comminuted material at room temperature, admixing the resultant dried material with magnesium oxide, gradually adding water and crushed ice to the resultant admixture, extracting the resultant product with acetic ester at room temperature, freeing each of the resultant extracts from solid material and then combining the said extracts, evaporating the resultant mixture of extracts in vacuo, boiling the resultant dried residue with benzene, separating the benzene from solid constituents in vacuo, dissolving the resultant powder in ethyl alcohol, diluting the resultant solution with water, inoculating the diluted solution with a crystal of the pure digitalis glucoside, and isolating the crystals which separate upon standing of the said inoculated solution.

7. A process for producing glucose-containing pure digitalis glucosides comprising the steps of comminuting freshly-reaped leaves of *Digitalis lanata*, wetting the comminuted leaves with ethyl alcohol whereby swelling of the latter takes place, extracting the resultant swelled mass with aqueous acetic ester at room temperature, separating the extracted mass from the extracting agent, further extracting the separated material with acetic ester, combining the resultant extracts and evaporating the combined material in vacuo, subjecting the resultant residue to the action of ether, eliminating the ether, grinding the resultant dry powder with magnesium oxide and only enough water to produce a paste, extracting the said paste with acetic ester, filtering the extract, evaporating the latter, subjecting the resultant residue to the action of ether, removing the ether, dissolving the residue in alcohol, diluting the solution with water, shaking the solution with ether, allowing the product to stand, and recovering the crystals which separate out.

8. A process for producing glucose-containing pure digitalis glucosides comprising the steps of extracting comminuted leaves of *Digitalis lanata* with boiling benzene, drying the extracted material at room temperature, wetting the dried material with water, extracting the wetted material with acetone, filtering the extracts, evaporating the filtered extracts, boiling the resultant residue with ether until a dry product is obtained, admixing the dry material with magnesium oxide and water to form a paste, extracting the resultant paste with acetic ester, filtering the resultant extract, evaporating the filtered extract, subjecting the residue to the action of ether, removing the ether, dissolving the residue in alcohol, diluting the solution with water, shaking the resultant aqueous-alcoholic product with ether, separating the ether layer, allowing the aqueous layer to stand until crystallization takes place, and recovering the resultant crystals.

EMIL WOLF.